(12) United States Patent
Vyas (10) Patent No.: US 10,362,127 B2
(45) Date of Patent: Jul. 23, 2019

(54) PROCURING FEEDBACK

(71) Applicant: PAYPAL, INC., San Jose, CA (US)

(72) Inventor: Adhish N. Vyas, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 113 days.

(21) Appl. No.: 15/193,591

(22) Filed: Jun. 27, 2016

(65) Prior Publication Data

US 2017/0374166 A1  Dec. 28, 2017

(51) Int. Cl.
*G06F 15/173* (2006.01)
*H04L 29/08* (2006.01)
*G06Q 30/02* (2012.01)

(52) U.S. Cl.
CPC ......... *H04L 67/22* (2013.01); *G06Q 30/0269* (2013.01); *H04L 67/20* (2013.01)

(58) Field of Classification Search
CPC ...... H04L 67/22; H04L 67/20; G06Q 30/0269
USPC ....................................................... 709/224
See application file for complete search history.

(56) References Cited

U.S. PATENT DOCUMENTS

| 2004/0075681 | A1* | 4/2004 | Anati ................. | G06Q 30/06 715/738 |
| 2008/0010132 | A1* | 1/2008 | Aaron ................. | G06Q 30/02 705/14.55 |
| 2009/0254838 | A1* | 10/2009 | Rao ................... | G06F 16/337 715/749 |
| 2012/0123904 | A1* | 5/2012 | Foerster ............. | G06Q 30/0625 705/26.62 |
| 2012/0191774 | A1* | 7/2012 | Bhaskaran ......... | H04H 60/33 709/203 |
| 2012/0324334 | A1* | 12/2012 | Leper ................. | G06F 16/957 715/234 |

* cited by examiner

*Primary Examiner* — Vivek Srivastava
*Assistant Examiner* — Atta Khan
(74) *Attorney, Agent, or Firm* — Haynes & Boone LLP (57) ABSTRACT

A system for procuring feedback from user when displaying content. The system implements operations for selecting a feedback mechanism based on prior user interactions with the feedback mechanism and other feedback mechanisms. The system uses the user responses to the feedback mechanism to better target content to the user and better determine which feedback mechanisms will provide the most valuable information over time.

20 Claims, 5 Drawing Sheets

PROCURING FEEDBACK

TECHNICAL FIELD

The present disclosure generally relates to encouraging user feedback, and more specifically, providing feedback options that tailor content for a user and tailor feedback mechanisms based on the user interactions.

BACKGROUND

Obtaining user feedback on applications is difficult. Developers often find it difficult to get user engagement in providing active feedback. Furthermore, a one size fits all feedback model is more likely to get no feedback or a small subset of users to provide feedback. Thus it would be beneficial if there were a dynamically changing feedback mechanism that is personalized to each user.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments of the present disclosure, systems and methods for obtaining feedback for targeted content is disclosed. In some examples, the system may have several different feedback requesting options to select from. The system, in some examples, may determine the best feedback requesting option to provide to a user with targeted content based on prior user interactions with the different feedback requesting options and/or other user interactions with the feedback requesting options. In some examples, response to the feedback requests from users may be used to tailor how content is targeted to the user. In some examples, the system may aggregate and orchestrate the collection of user data with and/or on behalf of third-party entities to maximize and/or increase user engagement with content.

In some embodiments a feedback system and method is provided. In some examples the system includes a non-transitory memory storing instructions and one or more hardware processors coupled to the non-transitory memory and configured to read the instructions from the non-transitory memory to cause the system to perform operations. The operations may include selecting an advertisement based at least in part on an advertisement keyword matching a profile keyword associated with user information identified by a received user identifier, causing a user device associated with the received user identifier to display the advertisement with a feedback request, the feedback request having an actuatable keyword that matches the advertisement keyword, receiving, from the user device, an indication as to whether the actuatable keyword was actuated, and adjusting the user information based on whether the actuatable keyword was actuated.

In some examples, a computer implemented method is disclosed. The method may include operations such as selecting an advertisement based at least in part on an advertisement keyword matching a profile keyword associated with user information identified by a received user identifier, causing a user device associated with the received user identifier to display the advertisement with a feedback request, the feedback request having a virtual slider associated with the advertisement keyword, receiving, an indication that the virtual slider was moved; and adjusting the user information based on receiving the indication that the virtual slider was moved.

Some embodiments disclose a non-transitory machine readable medium having stored thereon machine readable instructions executable to cause a machine to perform operations. In some examples the operation may include choosing an advertisement based at least in part on a content keyword matching a profile keyword associated with user information identified by a received user identifier, causing a mobile device associated with the received user identifier to display the content with a feedback request, receiving a response to the feedback request, and adjusting the user information based on receiving the response to the feedback request.

Figure 1:
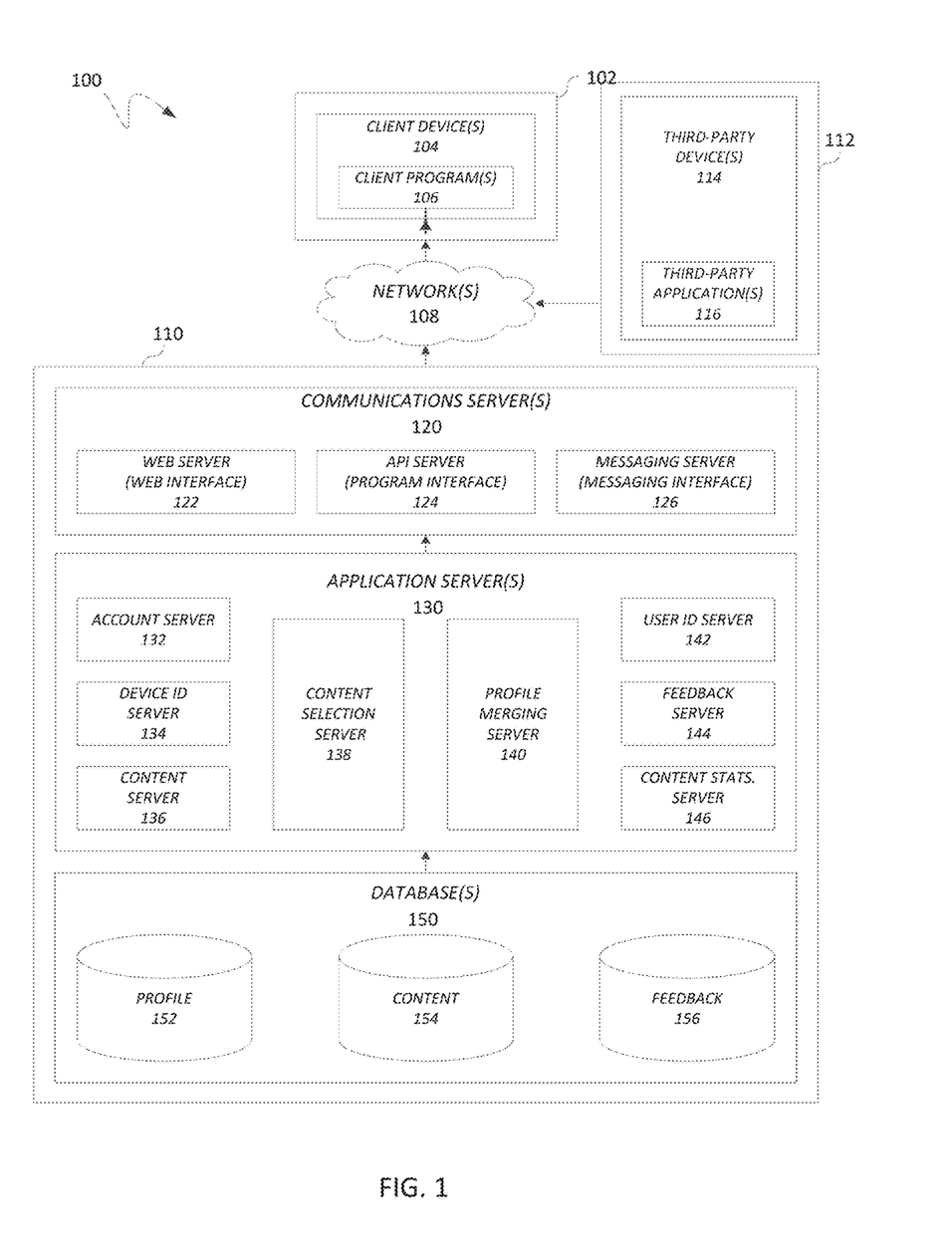
FIG. 1 is a block diagram of an example computing system that adapted for encouraging user feedback to content.

FIG. 1 illustrates, in block diagram format, an example embodiment of a computing system adapted for encouraging use feedback to content. As shown, a computing system 100 may comprise or implement a plurality of servers and/or software components that operate to perform various methodologies in accordance with the described embodiments. Some example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. In some examples, system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. In some examples, application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party devices 114 hosting third-party applications 116. In various implementations, third-party devices 114 and/or third-party applications 116 may host applications associated with or employed by a third party 112. For example, third-party devices 114 and/or third-party applications 116 may enable network-based system 110 to provide client 102 and/or system 110 with additional services and/or information, such as merchant information, data communications, payment services, security functions, customer support, and/or other services, some of which will be discussed in greater detail below. Third-party devices 114 and/or third-party applications 116 may also provide system 110 and/or client 102 with other information and/or services, such as email services and/or information, property transfer and/or handling, purchase services and/or information, and/or other online services and/or information.

In one embodiment, third-party devices 114 may include one or more servers, such as a content server that provides content for display. In some embodiments, the third-party devices may include a user and/or user device database that can provide information and profile information gathered from users and/or user devices by third party 112. In yet another embodiment, third-party severs 114 may include one or more servers for aggregating user data, content data, and other statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account management, advertisement handling, content handling, data gathering, data analysis, and other services to users and/or third parties that access network-based system 110. In various embodiments, client devices 104 and/or third-party devices 114 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party devices 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various services to clients and or third parties including, but not limited to, content targeting, advertisement targeting, content feedback handling, advertisement selection handling, user profiling, and/or the like. Application servers 130 may include an account server 132, device identification server 134, content server 136, content selection server 138, profile merging server 140, user identification server 142, feedback server 144, and/or content statistics server 146. These servers, which may be in addition to other servers, may be structured and arranged to configure the system for providing content and obtaining feedback associated with the content.

Application servers 130, in turn, may be coupled to and capable of accessing one or more databases 150 including a profile database 152, a content database 154, and/or feedback database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
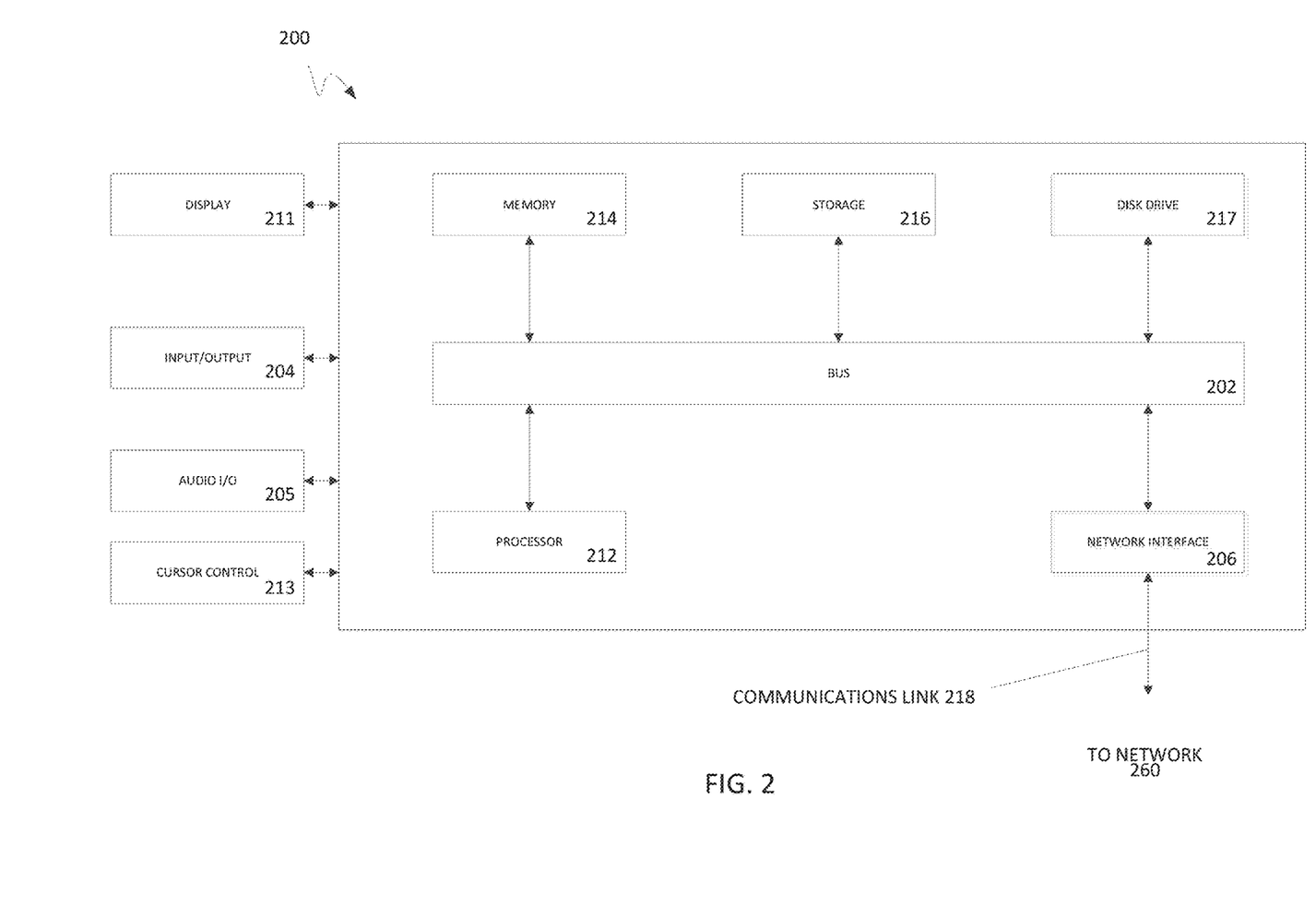
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
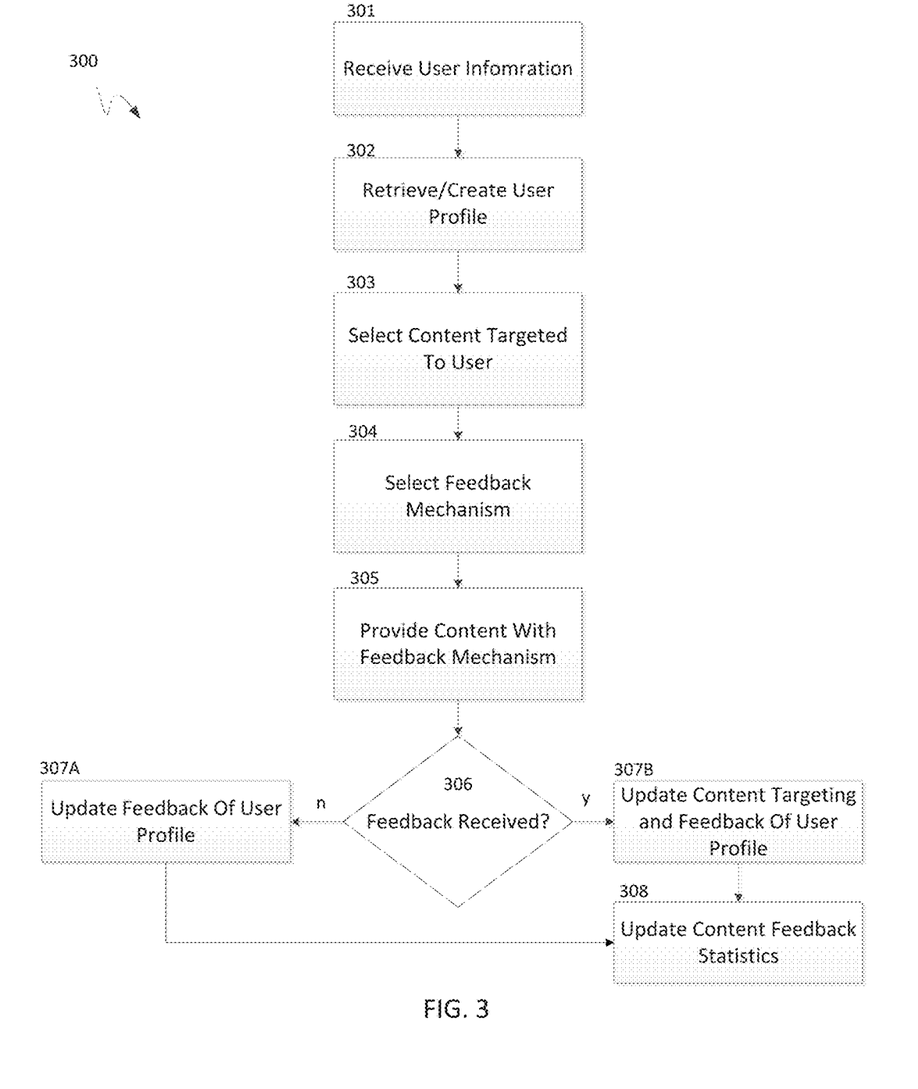
FIG. 3 is a flow diagram illustrating an example dynamic feedback process.

FIG. 3 illustrates example dynamic feedback process 300 that may be implemented by a system, such as system 100 of FIG. 1, according to some embodiments. According to some embodiments, process 300 may include one or more of operations 301-308, which may be implemented, at least in part, in the form of executable code stored on a non-transitory, tangible, machine-readable media that, when run on one or more processors, may cause one or more systems to perform one or more of the operations 301-308.

In some examples, process 300 may include operation 301. At operation 301, the system may receive user information such as an identifier of a user for content targeting. In some examples the content may be an advertisement, video content, a news article, virtual reality interactive, mixed reality interactive, augmented reality interactive, videogame and/or the like. User information may include a user identification, webpage browsing information, browsing session time, date, browsing session identifier, registration identifier, IP address, MAC address, device identifier, clickstream data, click path data, and/or other browsing information.

In some examples, the user information may be part of a web cookie or hypertext transfer protocol (HTTP) cookie. In some examples, the system or a third-party system may store a cookie on the user device, and the cookie may be accessed by the system or third-party system to retrieve user information. In cases where a third-party system retrieves the user information from the cookie the system may receive the user information from the third-party system. In some examples, the user information may be from several different third-party systems in conjunction with information retrieved by the system. For example, the system or one or more third-party systems may obtain the IP address or MAC address of a user device through direct network communications with the user device and the protocol that is used to conduct the network communications. In addition the system and the one or more third-party systems may also obtain other information through one or more cookies that the system and one or more third-party systems have access to on the user device. Using the IP address, MAC address and/or other identifying information, the system may be able to determine that certain information from different sources are associated with a single user and/or user device.

In some examples, user information may be provided by the user as part of an account creation. In some examples, user information may be collected by the system or one or more third-party systems and the user uses and application or website controlled by the system and/or the one or more third parties. For example, the system and/or one or more third-party systems may maintain and/or obtain user information and/or browsing information associated with a user as the user uses a website or application. For example, user information may be collected through social media website or application controlled by the system and/or third-party system. Social media websites generally have a login process which allows for the system or a third-party system to identify the user.

In some examples, process 300 may include operation 302. At operation 302, the system may retrieve and/or create a user profile. In some examples, the system, using the information received at operation 301, may determine whether a user profile exists for the user. In some examples, the system may determine if any of the received user information has identifying information that matches information for a user profile. For example, the system may check whether the IP address, MAC address, user ID, cookie ID, and/or other information received in operation 301 matches the same information of any user profiles held in a database maintained, operated, and/or accessed by the system. In the event that there is a match, the system may update and/or retrieve user information stored on the database that has the matching identification information. In the event the system does not find a match, the system may create a new profile and update it with some or all of the information receive at operation 301.

In some examples, the system may aggregate information about a user from multiple data collection systems, some which may be by a third-party. In this manner, content targeting may be based on a larger and more complete data set associated with a user and/or user device. In some examples, the system may correlate data from different sources to create a user profile. In some examples, the data may be correlated based on similar user information elements such as IP addresses, MAC addresses, device addresses, user ID information, and/or the like. In some examples, the system may determine several devices are associated with a user and attempt to merge and/or aggregate the user data associated with the several devices. For example, a user device may conduct an action through content provided by the system which may include the user providing user identifying information, such as a name, address, email address, and/or the like. When the user conducts another action with another device, the system may determine that the device is associated to the same user based on the name, address, email login information, and/or other information.

In some examples, the user profile may include browsing information associated with the user. For example, how websites were browsed, what content s have been seen or clicked on, what information is associated with the website that the user browsed. In some examples, the user profiles may include other information, such as what movies have been watched, what games have been played, and/or other information related to the different types of content. In some examples, the system may have receive and/or the system may identify keywords associated with the content that the user browsed. In some examples, the system may collect the keywords or be provided the keywords from a third-party system. In some examples, the system may scrape the keywords from the content or content providers and store it as part of the user profile. The keywords may be obtained from different types of media sources such as audio, video, images, and/or other types of media. The system and/or a third party system may convert media information into keywords by converting audio into text and/or conducting text recognition on images, video content, and/or the like.

Some of these operations may occur when a new profile is made and/or when a profile is updated. The system may leverage a natural language processors to identify the keywords, such as identifying nouns, noun phrases, names of objects, and/or the like. The system may leverage a dictionary of words to find keywords through keyword matching. The dictionary may have brand names, merchandise names, location names, keywords associated with content, advertisements, subject categories, and/or the like. In some examples, the keywords for the dictionary may be provided to the system from content providers.

In some examples, the user profile may include user preferences that have been provided to the system, content, such as advertisements, that have been targeted to the user, interactions the user may have had with content, when content was last targeted to the user (e.g. timestamp), and/or other information. In some examples, the system may maintain a ledger or log of content metrics associated with a particular user and/or user device. For example, the content metrics may be advertisement metrics which may include, but is not limited to, click numbers, impressions, actions (such as a resulting purchase through advertisement clicks), and/or the like.

In some examples, process 300 may include operation 303. At operation 303, the system may select content to be directed to the user. In some examples, such as when a new profile was created at operation 302, the content may be chosen based on the information received at operation 301. In some examples, when a profile already exists, the system may use information associated with the profile to select content for use. In some examples, the system may count the number of keywords that is associated with the content that also matches keywords associated with the profile. The different selectable content may be ranked from having the most matched keywords to the least. In some embodiments, the keywords may have a value associated with the keywords and the system may sum the values of the keywords that are matching between a particular content option and a user profile. In some examples, the values of each keyword may be specific to a user profile, to the content, or both. The different content may be ranked based on the highest or lowest summed value of the matching keywords. The value of the keywords may be preset and/or change based on user feedback. The system may select one of the content options that are highly ranked.

In some examples, the system may selected the highest ranked content option. In some examples, the system may select randomly from a predetermined number of the highest ranked content options. In some examples, the system may select randomly from all of the ranked content options with the probability of selecting a particular content option being skewed based on its ranking. For example, the system may implement a weighted random selection algorithm. In some embodiments, such as when rankings are determined based on a score value, the score value may be used to determine the probability that a particular content option is selected. For example, the system may select a content option using a lottery system wherein the scores are used for the number of ticket entries a particular content option has in the lottery.

In this manner, the score for each content option is directly related to the probability that the content option is selected. In some examples, to further skew the selection of content to the higher ranked content options, additional bonus score values may be provided to the higher ranked content options, such as the top three content options may receive an additional 50% score value based on its own score. In this manner, a system using the lottery method above would skew content selections more towards the top three ranked content options. Although this example skews the selection to the top three, the skew can be to any number, such as top 10, top 5, and/or the like.

In some embodiments, on one or more of the content options may be eliminated based on the last time the content was used for and/or shown to the user or how closely matched the content option is with a recently used content by the system. In some examples, content with similar keywords or that have keywords that overlap over a predetermined amount may be considered as related. In some examples, closely matched content may be based on how the content is categorized. For example, in the context of the content being an advertisement, advertisements may be categorized based on subjects and advertisements similarly categorized or under the same category with another advertisement recently used, or having a time stamp within a predetermined time, may be disregarded by the system. In some examples, the system may remove key words associated with advertisements recently shown for ranking or determining which advertisement to select.

Additionally, in some embodiments, the system may account for user content preferences when selecting content options. For example, the system may have received feedback regarding one or more content options that were selected for the user or displayed to the user previously. In some examples, the feedback may be the removal of keywords used by the system to select future content for the user. In some embodiments, the system may remove those keywords in response to the feedback received from the user.

In some embodiments, keywords may be associated with weighted values based on user feedback. For example, the feedback may have been a user increasing a bar on a slider which may indicated that the user would like to receive more similar content. In response, the system may increase the weight or value of one or more keywords associated with the content. In this manner, when the keywords associated with the user are summed during the content selection process, keywords with a higher weight and/or value will contribute more to the ranking of the content. Similarly, a user may reduce the relevance of a keyword and the system may, in response, lower the weighted value of the keyword. In some examples, the keywords may have negative values to further deter the user of content that include that keyword.

In some examples, keywords may be weighted and/or used depending on multiple factors, such as user feedback, social media trends, and/or the like. For example, a user may provide feedback reducing the importance of a keyword. As a response, the system may apply one or more conditions to the keyword before it is used to select a content option for the user. For example, one of the conditions may be that the keyword is trending on one or more social media websites. Trending can be a threshold value associated with the keyword social media velocity (mentions per second), acceleration (the change in velocity per second), a combination thereof, and/or the like. The system may, depending on the user feedback, change the threshold value of the social media trend for the keyword depending on the feedback. For example, the system may increase the velocity value for a condition for a keyword in response to the user providing negative feedback for the keyword. Similarly, the system may lower or eliminate the trend value condition for the keyword in response to the user providing positive feedback for the keyword.

In some examples, the feedback may have been to indicate that certain provided content was undesirable. In some embodiments, the system may determine which keywords are associated with the content that the user indicated was undesirable and remove those keywords from consideration when selecting another content option for the user.

In some examples, keywords may have a hierarchy or a "stickiness" ranking that may affect how easily keywords are removed from consideration regarding the selection of content. For example, the system may remove a keyword from use when selecting content after multiple negative indicators when the keyword is categorized as broad or has a higher stickiness rating. In contrast, the system may remove a keyword after a single negative indicator or with less negative indicators when the keyword is categorized as more specific and/or has a lower stickiness rating. The stickiness rating may be a predetermined value and/or calculated value based on how the word is used, how often the word is used in social media, and/or how many different content objects are associated with the word.

In some examples, the hierarchy, broadness, and/or stickiness rating for a keyword may depend on the number of content options that the keyword is associated with. In some embodiments, the rating may be based on the percentage of content options that use the keyword. For example, if the keyword is used in less than 5% of content options, a single negative indicator may cause the system to remove the keyword from use when selecting content for that user. Similarly, if the keyword is used between 5% and 30% of content options, the system may remove the keyword from use with a user after two negative indicators. Additionally, for keywords above 30%, the system may remove the keyword from use with a user (based on the user profile) after three negative indicators. In some examples, when a keyword is used in over a certain percentage of content options, the keyword may not be removed unless a user specifically requests removal of that keyword from use when interacting with a system provided feedback mechanism. In some examples, different negative indicators may be provided different weight, and instead of using the number of negative indicators for removing the use of a keyword, there may be a threshold weight. For example, a negative indicator for a keyword may be a user indicating content associated with the keyword was undesirable. However, that content may be associated with multiple keywords. Negative indicators received in this manner may be given a lower weight, such as half a point. In some examples, a negative indicator may be that a user did not click or interact with the content. Such an indicator may have even less weight, such as a tenth of a point. In contrast, a direct indicator, such as a user providing feedback that a keyword should not be used when targeting content to the user (e.g. actuating an [x] mark on a keyword), may have a much higher weight or a maximum possible weight. In some examples, the system may remove the use of a keyword for selecting content options for a user when a user provides a direct indicator that a keyword should not be used. An example of a direct indicator may be user provided feedback directed towards the keyword, such as the user selecting the keyword for removal.

In some examples, process 300 may include operation 304. At operation 304, the system may select a feedback mechanism for implementing with the selected content. In some examples, the feedback mechanism may depend, at least in part, on the type of content. In some examples the feedback mechanism may depend at least in part on information about the device, such as whether the device is a mobile device. For example, for mobile devices, additional feedback mechanisms may be available, such as feedback mechanisms that implement facial recognition, touch screen, and/or audio based feedback. In some examples, the feedback mechanism choice may depend at least in part on the type of feedback that was received previously for the same content. In some examples, the feedback mechanism may be used to obtain feedback to determine which keywords to associate with a user, user profile, user device, content, and/or the like, as described above in operation 303.

In some examples, the feedback mechanism may depend on information about the user, and/or previous feedback received from the user, which may be information held in the user profile. The system may balance one or more factors when attempting to select a particular feedback mechanism. In some embodiments, the system may balance between the likelihood of receiving user engagement and the quality or amount of information that the feedback mechanism is obtaining or requesting. For example, having an actuatable element that closes content like an x out box or "[x]" is simple and may obtain more engagement than a survey with data entry fields or a questionnaire with several multiple choice questions. However, when a user engages with a questionnaire or survey, the system receives more information and the information is of higher quality.

In some examples, the system may have predetermined, user provided, and/or admin provided values associated with the type of feedback. For example, a "[x]" type feedback may be valued at 1 and a response to a survey may be valued at 100. Over time, as different feedback mechanisms are provided to a user and the system receives or does not receive the feedback, the system can determine a rate of engagement for that particular user, such as 1 engagement over 1000 impressions. The value of the particular feedback mechanism may be multiplied to the engagement rate to calculate an expected data value when selecting the feedback mechanism. For example, if the "[x]" feedback mechanism had a feedback rate of 499 engagements per 1000 views (499/1000) and the feedback value of "[x]" was 1, the expected data value would be 499/1000. Similarly, if the rate of response to a survey was 9/1000 and the survey value was 100, the expected data value for the survey would be 900/1000. In this example, the expected data value of providing the survey feedback is higher than the "[x]" feedback, and the system may, in response, choose to use the survey feedback mechanism. In some examples, the system may randomly select from the feedback mechanism options with the feedback mechanism that has the higher expected value having an increased weight and likelihood of being chosen. In this manner, other forms of feedback mechanisms may continue to be used and the system could adjust as the feedback preferences of a user changes over time. One example of a weighted random selection would be to use a lottery system wherein the number of tickets to the lottery depends on the expected value of the feedback mechanism. In some examples, the system may have a base lower limit of selection probability for a feedback mechanism to ensure that the lesser effective feedback mechanisms are still used regularly.

In some examples, instead of individualizing the feedback mechanism value calculation to a particular user, the system may conduct the value calculation for the specific content option or content category over a plurality of users. For example, the system may determine that for a particular content option, the "[x]" feedback mechanism had a feedback rate of 499/1000 over a plurality of users and the survey feedback mechanism had a feedback rate of 9/1000 over a plurality of users. The system may then select which is the best feedback mechanism for that particular content option in a similar manner as discussed above, such as by lottery discussed above or in another manner.

In some examples, process 300 may include operation 305. At operation 305, the system may provide the content selected at process 303 with the feedback mechanism selected at operation 304 for display on the user device. In some examples, the system may provide the content and feedback mechanism to a third party to display through their own webpage and/or application. In some examples, the system may cause the user device to display the content through an interface plugin, such as a web interface, associated with the system.

In some examples, process 300 may include operation 306. At operation 306, the system may determine whether a user provided feedback for the content. In some examples, the system may receive an indicator as to whether the user provided any feedback for the content. For example, a third-party system may monitor whether the user scrolled passed the content, moved to another flow of a webpage or application, left the webpage or application displaying the content, paused the content, or other action that causes the content to no longer be displayed. In response, the third-party system may provide an indicator to the system that the content was ignored. Similarly, if the user interacts with the advertisements, such as clicking on the content, hovering a virtual pointer (e.g. mouse pointer) over the content, closing the content, interacting with the feedback mechanism, and/or the like, the third-party may notify the system of the interaction, information associated with the interaction, and/or the interaction type. In some examples, the system, rather than a third-party system, may monitor for interactions with the content and/or feedback mechanism. Depending on whether or not the system determines that feedback was received, the system may conduct one or more operations.

In some examples, process 300 may include operation 307A. In some examples the system may conduct operation 307A in response to determining that user feedback was not provided for the content at operation 306. At operation 307A, the system may update the user profile with regards to the feedback mechanism. For example, the system may update in the user profile how many times the feedback mechanism selected at operation 305 has been used with this user and how many times it has been successful and/or unsuccessful at obtaining user engagement and/or feedback. In this manner, feedback selection operation 304 is updated for when the next feedback mechanism is to be selected. For example, the likelihood that the feedback mechanism used at operation 305 is reduced for the particular user and/or user profile.

In some examples, process 300 may include operation 307B. In some examples the system may conduct operation 307B in response to determining that feedback was received at operation 306. At operation 307B, the system may update the user profile on how content is selected for this user based on the feedback. For example, the user may have selected a keyword indicating that the user is uninterested in content associated with that keyword. In response, the system may update the user profile to eliminate the keyword, reduce the weight of the keyword, and/or take other actions as discussed above. Furthermore, the system may track which feedback mechanism was used with the content such that the same feedback mechanism is not used again with the same content. Furthermore, statistics regarding which feedback mechanism was used may be updated for the system to select the next feedback mechanism for the user at operation 304.

In some examples, process 300 may include operation 308. At operation 308, the system may update information about the content used to better target the content. For example, if no feedback was received for the content, the system may note that the content did not receive any feedback. In contrast, if feedback was received, the system may keep track of which feedback mechanism was used. In this manner the system may use this information to help select which feedback mechanism to use at operation 304 with this content the next time this content is selected at operation 303.

Figure 4:
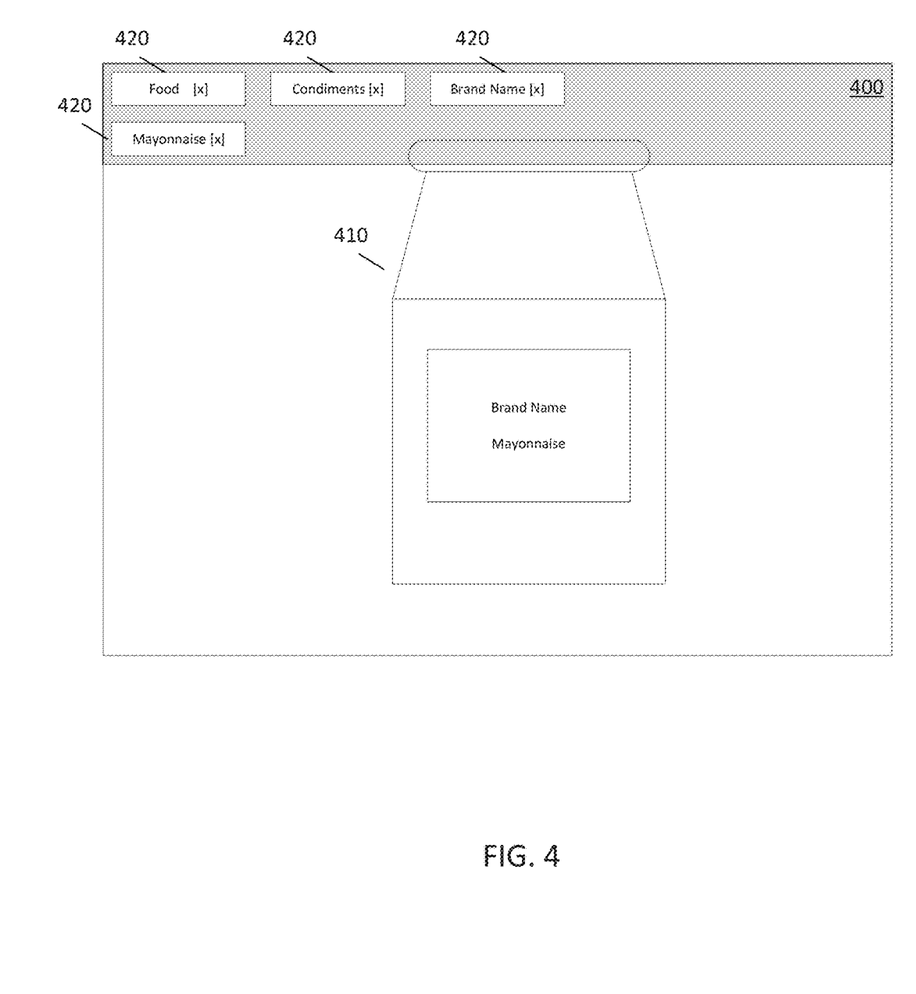
FIG. 4 illustrates an example graphical user interface of a feedback mechanism having selectable keywords.

FIG. 4 illustrates an example graphical user interface for a feedback mechanism 400 where the user can select keywords, according to some embodiments. In some examples, feedback mechanism 400 may be one of the feedback mechanisms that may be selected at operation 304 of FIG. 3.

As shown, feedback mechanism 400 is a graphical user interface that may be displayed on a user device, such as a smart phone, tablet computer, personal computer, and/or other computing devices. In some examples feedback mechanism 400 may be overlaid over content, such as advertisement 410. In some examples, as shown, advertisement 410 may display an image associated with the product and/or service being advertised. In some examples, advertisement 410 may be an actuatable element, such as a hyperlink, that may direct a user to a website and/or application associated with advertisement 410.

Feedback mechanism 400 may be shaded or colored in a manner such that a user can easily distinguish the feedback mechanism 400 from advertisement 410. Furthermore, feedback mechanism 400 may be partially transparent such that advertisement 410 is still viewable behind feedback mechanism 400 when overlaid over advertisement 410. The shaded portion of feedback mechanism 400 that overlays advertisement 410 may be not be actuatable and may also cause that portion of the advertisement not to be actuatable due to feedback mechanism 400. In this manner, a user does not have to fear that they may accidentally click on the advertisement or content when giving feedback.

In some examples, feedback mechanism 400 may display one or more keywords 420 associated with advertisement 410. In some examples, keywords 420 may be provided by a system such as one or more systems of FIG. 1 and/or a system implementing process 300 of FIG. 3. In some examples, keywords 420 may be actuatable elements that a user can select. In some examples, the "[x]" portion of keywords 420 may be the actuatable elements. A user may click or select one or more of keywords 420 to indicate to the system that the user would prefer advertisements that were not associated with those keywords.

Figure 5:
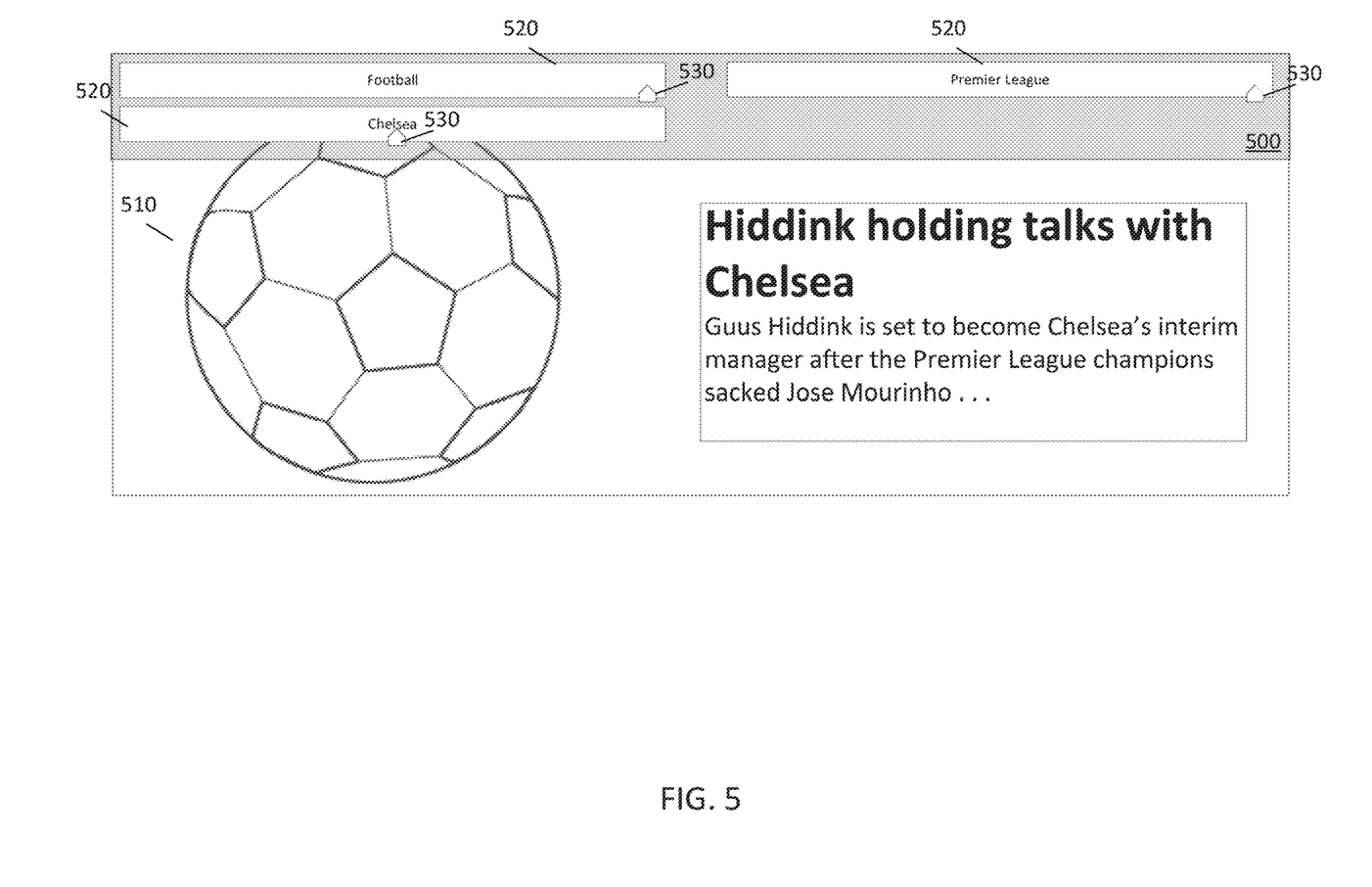
FIG. 5 illustrates an example graphical user interface of a feedback mechanism that implements a slider for feedback.

FIG. 5 illustrates an example graphical user interface of feedback mechanism 500 where the user can adjust the weight of keywords using a slider, according to some embodiments. In some examples, feedback mechanism 500 may be one of the feedback mechanisms that may be selected at operation 304 of FIG. 3. As shown, feedback mechanism 500 is a graphical user interface that may be displayed on a user device, such as a smart phone, tablet computer, personal computer, and/or other computing devices.

Similar to feedback mechanism 400 of FIG. 4, feedback mechanism 500 may be shaded or colored in a manner such that a user can easily distinguish feedback mechanism 500 from content such as news article 510. Furthermore, feedback mechanism 500 may also be partially transparent such that news article 510 is still viewable behind feedback mechanism 500 when overlaid on top of news article 510. The shaded portion of feedback mechanism 500 that overlays news article 510 may not be actuatable and may also cause that portion of the article not to be actuatable due to feedback mechanism 500. In this manner, the feedback mechanism does not punish a user for an accident miss click on a blank portion of feedback mechanism 500.

Similar to feedback mechanism 400 of FIG. 4, feedback mechanism 500 may display keywords 520 associated with news article 510 being displayed. Keywords 520 may be one or more keywords that were used in deciding to implement news article 510. In some examples, keywords 520 may be part of a slider GUI input element with sliders 530. In some examples, sliders 530 may be placed initially at current user settings associated with the keywords. The placement of sliders 530 may indicate the importance of keywords 520 for advertisement targeting to the user, the relative weight value of keywords 520 associated with the user, and/or the like.

In some examples, the user may select and move one or more sliders 530 to send feedback to the system that selected the advertisement. In this manner, the advertisement selecting system may adjust user preferences such that the advertisement selection system may better select advertisements relevant to the user. Additionally, this feedback could be used by the advertisement selecting system to gather metrics for the advertisements such that advertisers may better target and/or create advertisements.

In some examples, such as when news article 510 is for news articles, sliders 530 may represent popularity of an article before targeting it to the user. For example, one end of the slider may indicate that the user is interested in every article associated with the keyword, independent of how important the system determines the article is. A second end of the slider may indicate that articles associated with the keyword should not be shown to the user or not be shown unless the system determines that the article is important, trending, and/or popular. In some examples different sliders may represent different system preferences and the system may provide indicators as to what the sliders control (not shown). Furthermore, in some examples, each keyword may have multiple sliders for indicating preferences such as importance, relevance to the advertised product, relevance to the user, and/or the like. For example, many keywords may be used in different context and the user may be able to use the slider to better train a content system to correctly determine the context in which the user is interested in for a word. For example, a user may be interested in football as the word is used internationally but not for American football. The use may indicate using the slider that the word football as used in article about American football was not contextually correct but have another slider that indicates that football is important to the user. In this manner, the advertisement selection system may be able to determine that the user is interested in football in the context of soccer but not American football.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, some of the above embodiments have focused on advertisements and news articles, however, the system may work with other content. For example, the system may work for recommending video content, virtual reality content, augmented reality content, audio content and/or the like. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
in response to receiving a request for content from a user device associated with a user, obtaining a user profile associated with the user, wherein the user profile comprises content preferences and user feedback preferences of the user;
determining, for the user, first electronic content based at least in part on the content preferences of the user profile associated with the user;
determining, from a plurality of user input components, that a set of user input components are available on the user device;
selecting, from a plurality of electronic feedback mechanisms, a first feedback mechanism for obtaining feedback from the user regarding the electronic content based at least in part on the user feedback preferences of the user profile associated with the user and the set of user input components available on the user device, wherein the plurality of electronic feedback mechanisms specify different user input interface types for submitting the feedback, wherein the different user input interface types comprise at least one of a facial recognition input type, a touch screen input type, or an audio input type;
generating a feedback interface according to the first feedback mechanism selected for the user, wherein the feedback interface is configured to obtain a feedback input from the user according to a first user input interface type specified by the first feedback mechanism;
incorporating the feedback interface into the first electronic content to generate modified first electronic content;
causing the user device associated with the user to display the modified first electronic content;
detecting an interaction of the user with the feedback interface; and
adjusting the user feedback preferences of the user profile based on the detected interaction, wherein a second feedback mechanism from the plurality of electronic feedback mechanisms is selected for the user during a subsequent content presentation to the user based on the adjusted user feedback preferences.

2. The system of claim 1, wherein the operations further comprise adjusting the content preferences of the user profile based on the detected interaction, and wherein second electronic content is determined for the user in response to a second request for content based on the adjusted content preferences.

3. The system of claim 2, wherein the adjusting the content preferences of the user profile comprises reducing a value of at least one keyword in the content preferences of the user profile.

4. The system of claim 1, wherein the adjusting the feedback preferences of the user profile comprises updating a counter associated with the first feedback mechanism.

5. The system of claim 4, wherein the counter changes a probability that the first feedback mechanism will be selected for the user.

6. The system of claim 5, wherein the probability depends at least in part on the counter and a predetermined value associated with the first feedback mechanism.

7. The system of claim 1, wherein the determining the first electronic content comprises applying a weighted random selection algorithm on a plurality of electronic content, wherein a weight associated with the first electronic content is determined based at least in part on one or more content keywords associated with the electronic content matching one or more keywords in the content preferences of the user profile.

8. A method comprising:
in response to receiving a request for content from a user device associated with a user, obtaining, by one or more hardware processors, a user profile associated with the user, wherein the user profile comprises content preferences and feedback preferences of the user;
determining, by the one or more hardware processors, based at least in part on the content preferences of the user profile associated with the user, first electronic content for the user;
determining, by the one or more hardware processors from a plurality of user input components, that a set of user input components are available on the user device;
selecting, by the one or more hardware processors from a plurality of electronic feedback mechanisms, a first feedback mechanism for obtaining feedback from the user regarding the electronic content based at least in part on the user feedback preferences and the set of user input components available on the user device, wherein the plurality of electronic feedback mechanisms specify different user input interface types for submitting the feedback, wherein the different user input interface types comprise at least one of a facial recognition input type, a touch screen input type, or an audio input type;
generating, by the one or more hardware processors, a feedback interface according to the first feedback mechanism selected for the user, wherein the feedback interface is configured to obtain a feedback input from the user according to a first user input interface type specified by the first feedback mechanism;
incorporating, by the one or more hardware processors, the feedback interface into the first electronic content to generate modified first electronic content;
displaying, by the one or more hardware processors on the user device associated with the user, the modified first electronic content;
detecting an interaction of the user with the feedback interface; and
adjusting the user feedback preferences of the user profile based on the detected interaction, wherein a second feedback mechanism from the plurality of electronic feedback mechanisms is selected for a subsequent request for content from the user based on the adjusted user feedback preferences.

9. The method of claim 8, further comprising adjusting the content preferences of the user profile based on the detected interaction, wherein the adjusting the content preferences comprises changing a value associated with at least one keyword in the content preferences of the user profile, and wherein second electronic content is determined for the user in response to a second request for content based on the adjusted content preferences.

10. The method of claim 8, wherein the first user input interface type comprises the touch screen input type, and wherein the feedback interface is generated to include a virtual slider as the user-interactive element based on the first user input interface type, wherein the virtual slider represents a range of scores associated with a content keyword associated with the first electronic content.

11. The method of claim 8, wherein the adjusting the user feedback preferences of the user profile comprises updating a counter associated with the first feedback mechanism.

12. The method of claim 8, wherein the content preferences of the user profile comprises one or more keywords, wherein the determining the first electronic content comprises applying a weighted random selection algorithm on a plurality of electronic content, and wherein a weight for the first electronic content is determined based at least in part on one or more content keywords associated with the first electronic content matching the one or more keywords in the content preferences of the user profile.

13. The method of claim 8, wherein the first feedback mechanism is selected using a weighted random selection algorithm, wherein a weight of the first feedback request mechanism is determined based at least in part on a counter of interactions with the first feedback mechanism and a predetermined value associated with the first feedback mechanism.

14. The method of claim 13, wherein the counter of interactions is associated with the user.

15. A non-transitory machine readable medium having stored thereon machine readable instructions executable to cause a machine to perform operations comprising:
in response to receiving a request for content from a user device associated with a user, obtaining a user profile associated with the user, wherein the user profile comprises content preferences and user feedback preferences of the user;
determining, for the user, first web-based content based at least in part on the content preferences of the user profile;
determining, from a plurality of user input components, that a set of user input components are available on the user device;
selecting, from a plurality of electronic feedback mechanisms, a first feedback mechanism for obtaining feedback from the user regarding the first web-based content based at least in part on the user feedback preferences of the user profile associated with the user and the set of user input components available on the user device, wherein the plurality of electronic feedback mechanisms specify different user input interface types for submitting the feedback, wherein the different user input interface types comprise at least one of a facial recognition input type, a touch screen input type, or an audio input type;
generating a feedback interface according to the first feedback mechanism selected for the user, wherein the feedback interface is configured to obtain a feedback input from the user according to a first user input interface type specified by the first feedback mechanism;

incorporating the feedback interface into the first web-based content to generate modified first web-based content;

causing a mobile device associated with the user to render the modified first web-based content; and in response to detecting an interaction of the user with the feedback interface, adjusting the user feedback preferences of the user profile based on the detected interaction, wherein a second feedback mechanism is selected for the user during a subsequent content presentation to the user based on the adjusted user feedback preferences.

16. The non-transitory machine readable medium of claim 15, wherein the first web-based content is selected using a weighted random selection algorithm from a plurality of web-based content.

17. The non-transitory machine readable medium of claim 15, wherein the first feedback mechanism is selected using a weighted random selection algorithm from the plurality of electronic feedback mechanisms.

18. The non-transitory machine readable medium of claim 17, wherein a weight associated with the first feedback mechanism is determined based at least in part on a number of interactions with the first feedback mechanism indicated in the user feedback preferences of the user profile.

19. The non-transitory machine readable medium of claim 18, wherein the adjusting the user feedback preferences of the user profile comprises adjusting the number of interactions with the first feedback mechanism.

20. The system of claim 1, wherein the first electronic content comprises an actuatable element configured to perform an action when actuated, and wherein the feedback interface is incorporated into the first electronic content by (i) overlaying a partially-transparent interface layer comprising the feedback interface on a portion of the first electronic content and (ii) disabling a portion of the actuatable element of the first electronic content corresponding to the portion of the first electronic content.

* * * * *